United States Patent Office 2,815,298
Patented Dec. 3, 1957

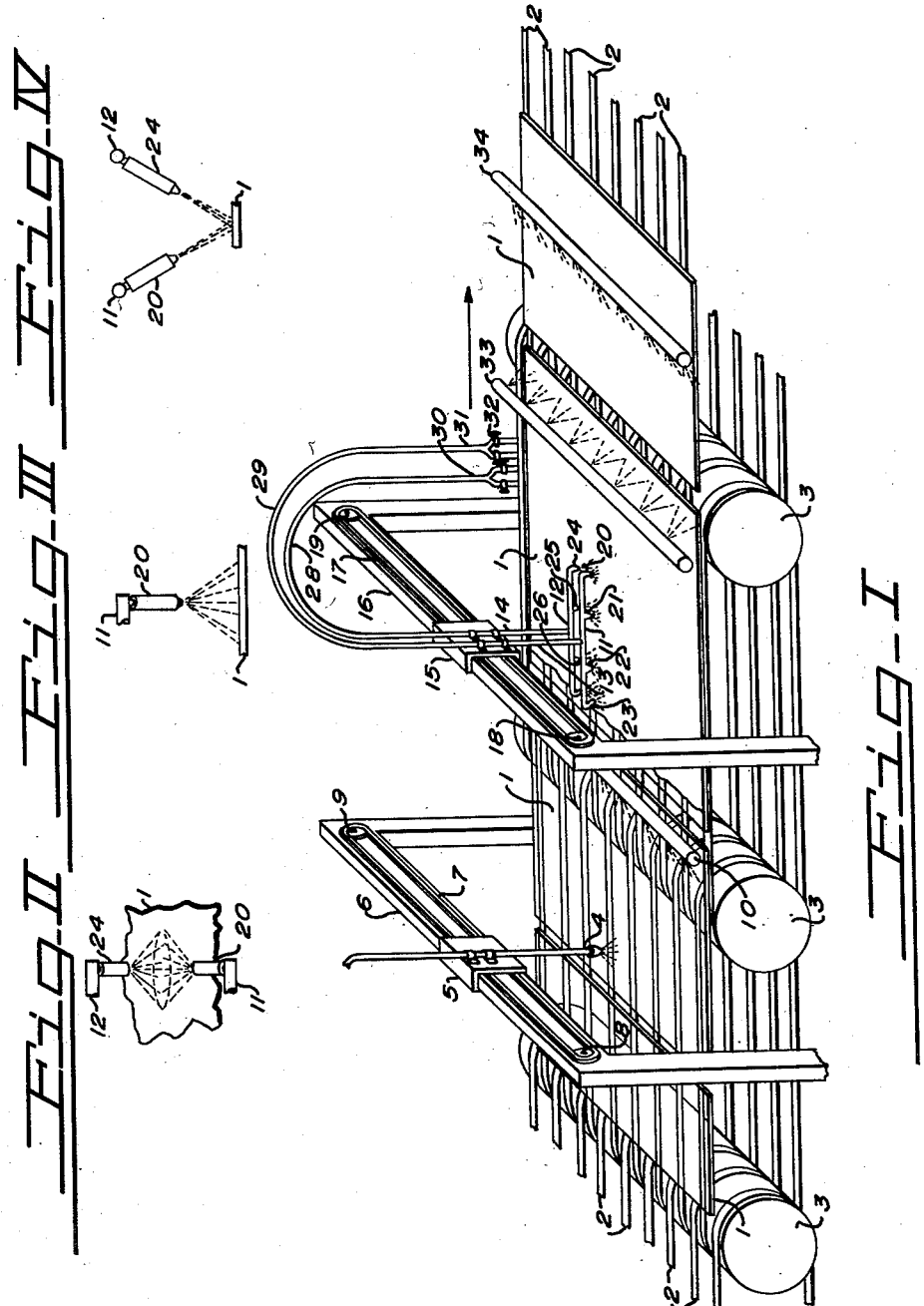

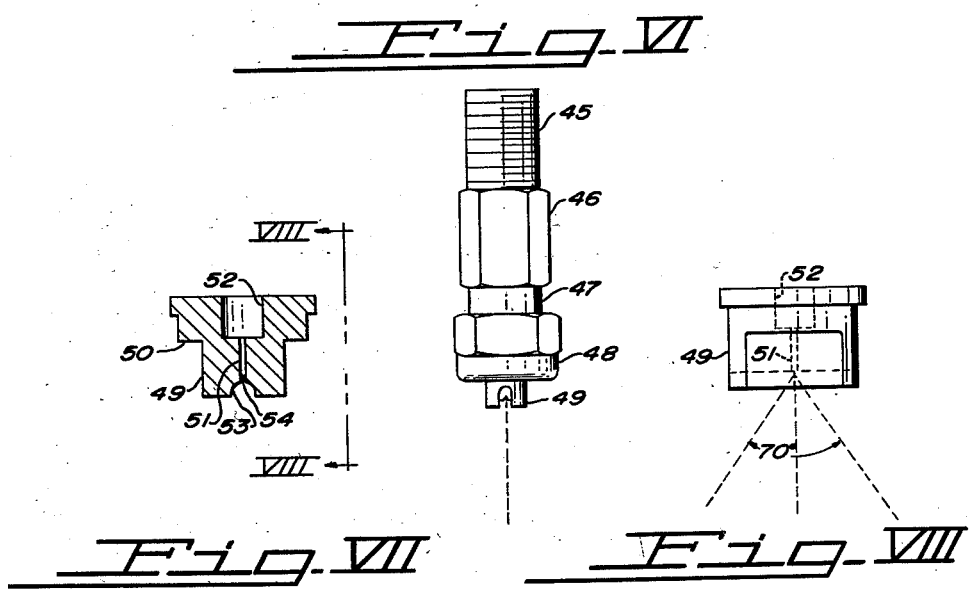
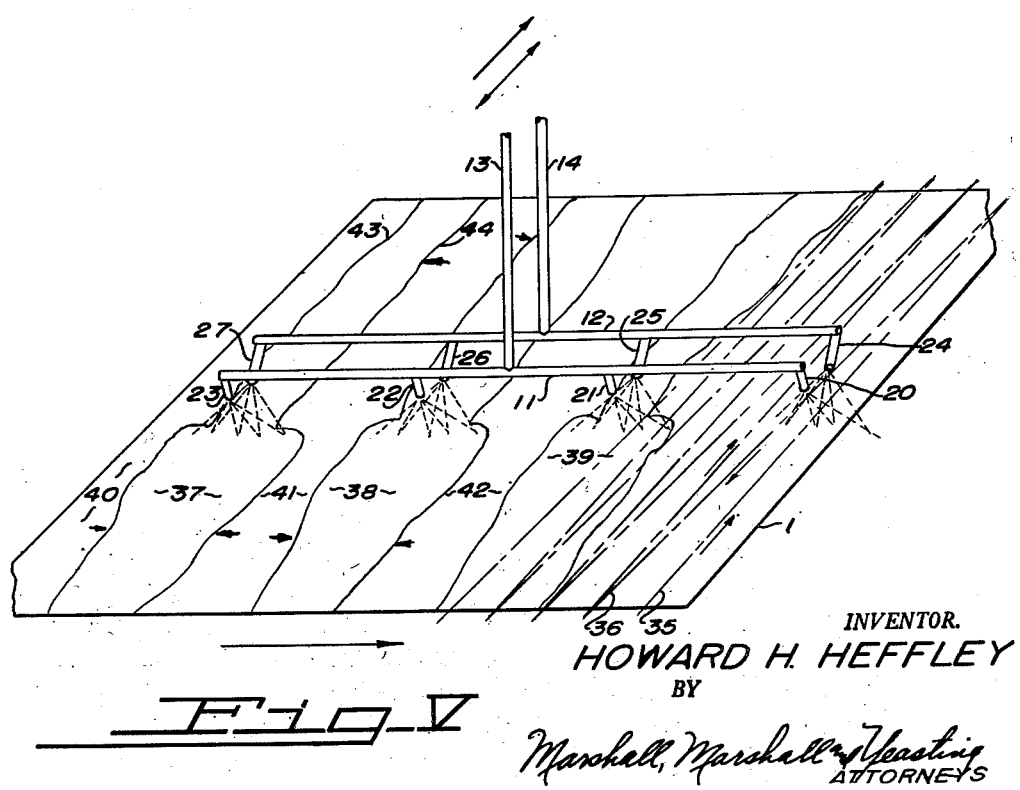

2,815,298

APPARATUS AND METHOD FOR SILVERING MIRRORS

Howard H. Heffley, Toledo, Ohio, assignor to The Toledo Plate & Window Glass Company, Toledo, Ohio, a corporation of Ohio Application April 6, 1953, Serial No. 346,819

5 Claims. (Cl. 117—35)

This invention relates to the manufacture of mirrors and in particular to an apparatus and a method for applying silver to mirrors.

Reflective metallic coatings such as a silver backing of a mirror are ordinarily applied by precipitating the metal from a metal bearing solution applied to the surface. Thus in applying a silver film for a mirror a solution of silver nitrate and a reducing solution is applied to the mirror and the silver allowed to precipitate out of the solution onto the glass. Various solutions and various reducing agents have been used in the manufacture of mirrors. One of the chief difficulties in production is to obtain a material which is safe to handle and which will provide a thin but very uniform deposit of silver. Silver may be precipitated from a silver ammonium nitrate solution by using a reducing solution composed of either sugar, formaldehyde, or compounds known as glyoxals or hydrazines. The glyoxal solutions are described in Peacock's Patent No. 2,363,354. The hydrazine solutions are described in Peacock's Patent No. 2,214,476.

The sugar reducing solutions and the formaldehyde solutions have been known for quite some time. These various solutions vary widely in the speed with which the silver is reduced from the solution and deposited on the glass. For example, the sugar solutions are comparatively slow in their reaction time while the glyoxal and hydrazine solutions are extremely rapid. Thus if one uses a hydrazine reducing compound one may spray, using ordinary spray guns, a solution of the silver nitrate and the hydrazine as commingling sprays and the silver reduces on the glass almost as fast as the sprays themselves strike the glass. The glyoxal solutions may be used the same way.

If a spraying process is used as described in Peacock's patents one must be very careful to maintain the conditions of temperature and strength of solution in order that satisfactory silver films may be produced. The more slowly reacting solutions allow a much wider variation in operating temperature and in quantities of material without adversely affecting the resulting silver film.

Another disadvantage of the spray process method of applying solutions is the loss of solution and contamination of equipment from rebound of solution from the surface. The rapid expansion and sweep of the high pressure air used with the spray guns also carries off a large part of the silver solutions.

The principal object of this invention is to provide a method for and apparatus for automatically applying a metal salt solution and a reducing solution to a surface in a manner that eliminates much of the loss of material and yet provides a very uniform deposit of metal.

Another object of the invention is to provide a method of silvering mirrors that requires a minimum of equipment none of which is critical in adjustment nor difficult to keep in operating order.

Another object is to provide a method of continuously and forcibly applying silvering solutions without requiring a supply of clean, filtered, compressed air and without driving any of the solution upwardly onto the mechanism used for applying the solutions.

A still further object of the invention is to provide a method of applying silver and reducing solutions in successive applications in which each application is applied after the previous application has had chance to react and deposit its silver content.

A still further object of the invention is to apply the silver and reducing solutions in a manner that keeps the spent solution or sludge constantly in motion and out of the path of the oncoming fresh solution so that there is no possibility for the sludge resulting from the solutions to adhere to the silver film and produce imperfections therein.

More specific objects and advantages are apparent from the following description of a preferred embodiment of the invention.

According to the invention the glass to be silvered is carried on a conveyor through a preparation zone, a silvering zone, and finishing zone. In the silvering zone a plurality of pairs of nozzles are carried on a framework for reciprocation transversely of the conveyor. One nozzle of each pair is supplied with silver solution while the other nozzle supplies the reducing solution. The discharge from the nozzles, in fan shaped streams, impinges on the glass in a generally elliptical mixing zone where the two solutions are throughly mixed and from which zone the solution flows in all directions on the surface of the glass. As the framework carrying the nozzles reciprocates across the sheet of glass on the conveyor the streams from the nozzles provide areas of fresh solution, one area for each set of nozzles, separated by intermediate areas of spent solution or sludge. Since the nozzles follow a fixed transverse path while the glass is moving slowly along the conveyor this area of fresh solution extending across beneath the nozzles moves across the face of the sheet of glass. Similarly, the spent solution or sludge held between the paths of the nozzles also moves relative to the glass and finally drains down through the conveyor as the trailing edge of the glass sheet passes the path of the nozzles.

The spacing of the nozzles along the direction of travel of the glass and the speed of the nozzles transversely to the path of the glass is such that the channel or area of clear solution is nearly but not completely overrun by the sludge between the times the nozzles pass in one direction and their return. This combination of speeds and spacing of the nozzles allows the flow of fresh fluid from the mixing area onto the glass to keep the sludge or spent solution constantly in motion so that there is no chance for particles of sludge to settle out and impair the surface of the glass or the silver film deposited thereon.

By applying the silver depositing solutions by means of finely divided streams solely by hydraulic pressure and hence without the use of air atomization or other driving means a soft stream is produced which, while sufficient to drive the sludge laterally out of the way and keep the area clear, nevertheless causes no bounce or spattering of solution from the glass. The nozzles so operating without the use of air may be denominated non-air-blast nozzles and the streams emitted from the nozzles may be denominated blast free streams of droplets. A small amount of solution is lost at each end of the stroke of the nozzles since the nozzles must travel beyond the edge of the glass. The separation of the pairs of nozzles along the direction of movement of the glass is sufficient to allow the fresh solution to react and become spent solution as it deposits its silver before the next pair of nozzles reaches the same area of glass to apply a second coat of silver film.

The preferred embodiment of the invention is illustrated in the accompanying drawings.

In the drawings:

Figure I is a diagrammatic view of a portion of the conveyor including the portion of the preparation zone, the silvering zone or film applying zone, and a portion of the finishing zone.

Figure II is a plan view of one of the pairs of nozzles.

Figure III is a side elevation of the pair of nozzles shown in Figure II.

Figure IV is an end elevation, looking in the direction of movement of the glass, of the pair of nozzles shown in Figures II and III.

Figure V is an enlarged diagrammatic view of a sheet of glass and the nozzles cooperating therewith to apply the silver solution. This figure illustrates the sludge patterns produced by the spent solutions.

Figure VI is a side elevation of one of the nozzles.

Figure VII is a section taken through the tip of one of the nozzles.

Figure VIII is another view of the tip of a nozzle as seen from the line VIII—VIII of Figure VII.

These specific figures and the accompanying description are intended merely to illustrate the invention but not to impose limitations on its scope.

In a mirror manufacturing apparatus constructed according to the invention glass plates or glass sheets 1 that are to be silvered are carried on a conveyor comprised of a plurality of V-belts 2 trained over wide pulleys 3. As shown in Figure I the glass sheets 1 progress from left to right and first enter and pass through a preparation zone in which they are cleaned and then treated with a stannous chloride solution from a nozzle 4 supported from a carriage 5 that is reciprocated transversely of the conveyor on a track 6. The carriage 5 is driven by a chain or belt 7 that runs over a pair of pulleys 8 and 9 arranged at the ends of the track 6. A motor, not shown, drives the chain 7 while a connection between the chain 7 and the carriage 5 slides up and down in the carriage as the connection moves around the pulleys 8 and 9. This construction is similar to that shown in Bramsen et al., Patent No. 2,246,502.

Before reaching the nozzle 4 the glass has been washed very carefully to remove all traces of foreign matter and is wetted down or rinsed that deionized water. The stannous chloride solution leaves minute particles or molecules of tin on the surface of the glass to aid in the deposition of the silver. After passing the nozzle 4 the glass approaches a header 10 that sprays water toward the approaching glass to thoroughly rinse off the remaining stannous chloride solution and any excess water so that the glass carries a thin film of water as it approaches the silvering station.

The apparatus for applying the silvering solutions comprises a pair of manifolds 11 and 12 that are supported by downwardly extending pipes 13 and 14 with the manifolds 11 and 12 extending in the direction of travel of glass on the conveyor and a short distance thereabove. The vertical pipes 13 and 14 are mounted from a carriage 15 that is adapted to reciprocate along a track 16 extending transversely of the conveyor. The carriage 15 is driven by a chain 17 running over sprockets 18 and 19 mounted at the ends of the track 16. The sprockets 18 and 19 are driven by a motor, not shown.

The manifold 11 carries a series of non-air-blast nozzles 20, 21, 22 and 23 while the manifold 12 carries a similar series of non-air-blast nozzles 24, 25, 26 and 27.

The vertical pipes 13 and 14 are connected through flexible hose lines 28 and 29 to solution supply pipes 30 and 31. As shown, a plurality of valves 32 are shown in branch leads feeding the supply pipes 30 and 31. Solution tanks or containers, preferably of such size to hold a reasonable supply of fluid, are supplied with air under pressure so that the solutions are fed through the hoses 28 and 29 to the nozzles at approximately 45 pounds per sq. in. of pressure. The amount of pressure required varies considerably with the design of the nozzles and the solutions employed. Satisfactory results have been obtained with pressures as low as 25 to 30 pounds per sq. in. and as high as 60 pounds per sq. in. The valves 32 allow separate containers to be employed for each of the solutions and allow one container to be substituted for another as the first is emptied. By carefully watching the flow of solution an operator may transfer from one supply tank to another without affecting the operation of the equipment.

As the glass leaves the silvering station its carries with it a certain amount of sludge or spent solution which must be washed off. To do this a pair of headers 33 and 34 are provided to spray deionized water onto the glass, the spray coming from the header 33 serving to dilute the sludge and keep it in motion directing it in the direction of travel of the conveyor while the second header 34 with its spray drives the sludge back toward the first header 33. Thus the sludge is agitated and held between the two sprays so that it may drain down through the space between the sheets of glass. The glass after passing the header 34 is ready to be dried and painted.

The nozzles 20 to 27 inclusive are preferably designed to give a substantially fan-shaped stream as illustrated in Figures II, III and IV. The stream issuing from any nozzle is a few degrees thick and 70 to 75 degrees wide in the other direction. The nozzles in each pair are also arranged to have an included angle from 15 to 60 degrees between the streams, that is each of the nozzles is inclined from 7 to 30 degrees. This arrangement is required so that the solutions are effectively and thoroughly mixed as they approach and strike the surface of the glass. The permissible amount of intermingling in the air varies inversely as the reaction time of the solutions. As may be seen in Figure II the streams from the nozzles 20 and 24 intersect or mingle on the surface of the glass 1 to give a generally elliptical mixing area from which the mixed solution flows in all directions. The side view of the streams as seen in Figure III illustrates the width of the path covered by the streams as the carriage 15 carries the nozzles 20 to 27 across the glass. Likewise Figure IV shows the approximate angles of the streams as they strike the glass.

Figure V shows at enlarged scale a sheet of glass being silvered and the position of the manifolds 11 and 12 and the nozzles 20 to 27 inclusive as they apply the solutions to the glass sheet 1. As shown at the right in the figure the path of the stream from the nozzles 20 and 24 may start at the lower right hand corner of the sheet 1; proceed along an inclined line 35 across the sheet to the opposite side; then reverse and return along a second inclined line 36. The nozzles and manifolds move transversely of the conveyor along the track 16 while the advance of the conveyor causes the successive traverses of the streams from the nozzles to incline toward the left across the sheet of glass.

In a commercial embodiment of the invention the conveyor operates at 4 feet per minute while the carriage 15, carrying the manifolds 11 and 12, moves from 140 to 160 feet per minute. In this commercial embodiment the conveyor is slightly over 6 feet wide, the total travel from one end to the other of the stroke of the carriage 15 and the manifolds 11 and 12 being approximately 7 feet. Thus, the manifolds make approximately ten complete cycles back and forth across the conveyor each minute. During this time the glass advances approximately 4 feet. In this commercial embodiment nozzles are spaced approximately 1½ feet apart along the manifolds 11 and 12. With these proportions the manifolds make approximately four complete trips across the glass before the edge of glass advances from one set of nozzles to the next.

As the glass first approaches the silvering station and its leading edge passes beneath the nozzles 23 and 27 these nozzles deposit a thin sheet of mixed solution on the glass. The force of the nozzles tends to drive the solution sidewise on the glass, that is sidewise to the path of the nozzles, so as to leave a thin channel or layer of clear solution 37 extending across the sheet of glass. The travel of the manifolds back and forth is sufficiently rapid so that the spent solution driven sidewise from this path does not have time to return and completely inundate this clear area before the next pass of the nozzles. As the glass progresses it soon reaches a point where the nozzles 22 and 26 repeat this performance in laying down a second layer or second film of clear solution 38. This next layer of fresh solution 38 deposits a second layer of the silver onto that put down by the nozzles 23 and 27. Likewise as the glass progresses further the nozzles 21 and 25 repeat by laying down a third layer of silver from fresh solutions in the paths 39. This continues until the nozzles 20 and 24 lay down the fourth layer of silver or the fourth application of solution. Fewer or more pairs of nozzles may be used depending upon conveyor speed, desired coating thickness, and the concentration and reaction time of the solutions.

The rapid transverse reciprocation of the manifolds and nozzles keeps the four channels, the areas 37, 38, and 39 and a similar area for the nozzles 20 and 24, open across the glass. Intermediate these spaces the sludge, the spent solution, is held in areas 40, 41, 42 etc., by repeated passage of the nozzles. It should be noted that the areas of spent solution, i. e. areas 40, 41, and 42 etc., remain fixed in space relative to the path of the nozzles and the manifolds and thus sweep slowly across the sheet of glass. As the trailing edge of the sheet of glass passes beneath these areas the spent solution drains from this trailing edge and falls through the conveyor into a drain beneath. Only that area of spent solution which is to the right of the nozzles 20 and 24 in Figure V is carried along to be washed from the glass by the headers 33 and 34.

The width of the individual streams from the nozzles is sufficiently wide and the time between traverses sufficiently small so that two or three layers of fresh solution are applied to each section of glass before that section passes beneath the sludge and thus is covered until the next set of nozzles break the sludge away and apply more solution to deposit more silver.

When the apparatus is employed to silver small mirrors 1½ to 3 feet in either dimension the spent solution or sludge patterns are not as pronounced as they are on the larger stock sheets which measure approximately 6 by 10 feet. This is because the smaller sheets of glass are not placed tightly edge to edge on the conveyor but rather are spaced with perhaps one inch gaps between the successive pieces of glass. Therefore as these gaps pass beneath the nozzles the sludge is driven off and drains through these gaps so that the quantity accumulated is not nearly as great as it is on a large sheet. When silvering the stock sheets which are about 6 by 10 feet the spent solution or sludge pattern develops to quite a very pronounced degree because of the large amount of spent solution which is actually accumulated between the paths of the nozzles before the whole sheet has passed. During the first approach when the nozzles 23 and 27 are applying their solution there is very little sludge to be taken care of. However, after the glass has passed along and the nozzles 22, 26; 21, 25 have added their contributions the amount becomes sufficient so that the clear channels of fresh solution are almost completely covered by the overflow of sludge between successive traverses of the manifolds and nozzles.

In order to secure good quality in the mirrors and prevent imperfections by the deposits of sludge it is necessary to keep the sludge in motion at all times and to keep the fresh solution under the sludge. This means that the fresh solution must be driven down forcibly enough so that the sludge is driven laterally away from the areas being silvered. In the arrangement shown the sludge pattern is narrow enough between the nozzles so that it is kept continuously in motion as the streams pass one way and then the other. Also the spacing between the nozzles is great enough so that enough room is left for the sludge to flow on the glass without overflowing into the areas being silvered. The ebb and flow of the sludge and spent solution is indicated in Figure V, by the boundary lines 43, 44 in the upper part of the figure indicating the sludge closing in on a clear area, and then as the streams from the nozzles pass indicating that these encroaching boundaries of sludge are driven back.

The relative spacing between the nozzles and the speed of the conveyor and the manifolds transversely of the conveyors may be varied as long as the conditions are met that the sludge or spent solution is kept in motion and not allowed to completely overrun the channels of fresh solution between successive passes of the nozzles. With the particular conveyor speeds and manifold speeds transversely of the conveyor, i. e. a conveyor speed of about 4 feet per minute and a manifold speed in the general range of approximately 140 to 160 feet per minute an eighteen inch spacing between nozzles gives very satisfactory results. In experiments the nozzles were spaced as close as 9 inches apart but it was found with such close spacing that there was insufficient room for the sludge between the nozzle paths and that the nozzles could not drive through this sludge to get the fresh solution down next to the glass where it could deposit its silver on the glass. Likewise, with wider spacing in the neighborhood of 24 to 28 inches there was so much space between the successive stream patterns that the sludge was not kept in active motion and thus some of the sludge was allowed to settle and could not then be adequately dislodged by successive streams of fresh solution. In between these extremes in the neighborhood of eighteen inches spacing it was found that both adequate motion of the sludge and adequate space between the particular sludge patterns was available so that the fresh solution could keep the sludge driven off the active areas without too much encroachment and without wasting much of the solution in driving the sludge away.

With this control of the solutions one does not need the extreme reaction speed of the hydrazine formulas for reducing the silver because considerable time is available for the fresh solution to react and precipitate its silver. This particular method works very satisfactorily with the relatively slower sugar reducing solutions which require considerable time to deposit the silver. In fact by using several sets of nozzles and applying the fresh solutions by stages and driving the spent solution away one is able to commercially, in a continuous process, produce first quality mirrors using the older types of formulas which were considered to be entirely unsuited for commercial automatic mirror manufacturing equipment.

The nozzles for applying the solutions are illustrated in Figures VI, VII and VIII. As seen in Figure VI each of the nozzles comprises a nipple 45 adapted to be threaded into a fitting in a manifold; a hexagonal section 46, to which a wrench may be applied; and a tubular section 47 extending down to receive a cap 48 that holds a tip 49 in place. While not shown in the drawings, a strainer may be included in the cylindrical portion of the section 47 and extending up into the nipple 45.

As seen in Figure VII the tip 49 has an angular shoulder 50 to fit in the cap 48. It also has a small hole 51 drilled axially through the tip and breaking into a larger counterbored hole 52 that leads up to the filter included in the cylindrical section 47. A semicylindrical transverse slot 53 is cut across the bottom face of the tip 49. Then at the very top of this semicylindrical transverse slot a small V-cut parallel to the semicylindrical cut is taken. This small V-cut 54 breaks into the conical lower end of the hole 51. This hole 51 is not drilled completely through but only far enough so that the drill tip which is grounded to the ordinary form breaks into the V-cut. Thus the opening from the lower end of the small hole 51 is actually elliptical in form. The boundaries of this hole are defined by the intersection of the sides of the V-cut which is of about 20 degrees included angle and the conical bottom of the hole 51. This elliptical hole, in combination with the small amount of flare of the V-cut, causes the issuing stream from the nozzle to be very narrow as seen in the plane of Figure VII but to spread out like a fan with an included angle of around 70 to 80 degrees as seen in the section Figure VIII. It will be observed that no compressed air is supplied to the nozzle. The stream emitted by the nozzle thus is blast free.

This fan shaped stream provides very efficient mixing of the silvering solutions as they strike the glass and also provides considerable lateral force tending to drive the solutions sidewise with respect to the travel of the nozzles so as to control the sludge and prevent it from overrunning and covering the areas being supplied with fresh streams of solution.

While this silvering method has been described in connection with the deposition of silver it is equally applicable to depositing other metallic elements which may be used as thin films either in the manufacture of mirrors or other uses where an extremely thin film must be deposited on a non-conducting surface. The method does not require high speed in the chemical reaction between the solutions but may be used with the more slowly acting solutions.

Various modifications in the size and operation of the equipment and in the design of the nozzles may be made without departing from the scope of the invention.

Having described the invention, I claim:

1. A method of manufacturing mirrors comprising the steps of moving glass to be coated through a preparation zone, a coating zone, and a washing zone, providing at least one generally fan shaped blast free stream of droplets of a first liquid, providing at least one generally fan shaped blast free stream of droplets of a second liquid, said first liquid bearing a metal compound from which the metal may be precipitated to form a mirror coating on the glass when the liquids are mixed, said second liquid containing an ingredient capable of causing such precipitation when the liquids are mixed, directing said streams toward the glass and obliquely toward each other to provide thorough mixing of the liquids on the glass, sweeping said streams to and fro transversely of the path of the glass, and maintaining sufficient velocity of the streams that the area swept clear by the streams on one traverse does not close prior to the next traverse of the streams.

2. A method of manufacturing mirrors comprising the steps of moving glass to be coated through a preparation zone, a coating zone and a finishing zone, providing a plurality of blast free streams of droplets of a metalizing solution directed against the glass, providing a plurality of blast free streams of droplets of a reducing solution directed against the glass, the areas of impact of the streams being adjusted to produce thorough mixing of the solutions, sweeping said streams transversely of the glass as the glass moves through the coating zone, and adjusting the speed of the sweep and spacing of the streams so that the spent fluid driven aside by the streams flows across the glass with each traverse of the streams without quite meeting in the path of the streams.

3. A method of silvering mirrors comprising the steps of moving the glass to be silvered through a preparation zone, a silvering zone, and a finishing zone, providing in the silvering zone at least one generally fan shaped blast free stream of droplets of a silver containing liquid, providing at least one generally fan shaped blast free stream of droplets of a reducing liquid, directing the streams to commingle on the glass, sweeping the streams across the glass to distribute the mixed liquid, providing sufficient pressure in the streams to produce lateral flow of mixed liquid from the points of impact, and repeating the traverse of the streams before the laterally swept liquid may flow across and cover the path of the streams.

4. A method of silvering mirrors comprising the steps of moving the glass to be silvered through a preparation zone, a silvering zone, and a finishing zone, providing in the silvering zone a plurality of generally fan shaped blast free streams of droplets of silver carrying liquid, providing a plurality of generally fan shaped blast free streams of droplets of reducing liquid, directing said streams in pairs so that the liquids are thoroughly mixed and flow laterally from the areas of impact, arranging the plurality of streams in spaced relation along the path of the glass, sweeping the streams transversely of the path of the glass, and adjusting the speed and repetition rate of the transverse sweep so that a thin sheet of active mixed fluid is left along the path of each pair of streams and a thicker sheet of spent fluid is held between said paths by the repeated passages of said streams.

5. In an apparatus for silvering mirrors, in combination, a conveyor for carrying glass through a processing zone, a plurality of non-air blast nozzles each adapted to deliver a fan shaped stream of droplets, means for supporting said nozzles in pairs for reciprocation along a path immediately above and transverse to the conveyor, means for supplying a silver bearing solution to one nozzle of each pair and a reducing solution to the other nozzle of each pair, said nozzles of each pair being inclined toward each other and directed toward the glass to provide a generally elliptical area of common impact and mixing with the long axis of the area extending parallel to the conveyor, said pairs of nozzles being spaced apart along the direction of the conveyor for defining successive areas of application of solution separated by areas of spent solution.

References Cited in the file of this patent

UNITED STATES PATENTS

| | | |
|---|---|---|
| 1,919,798 | MacLaurin | July 25, 1933 |
| 2,118,212 | MacLaurin | May 24, 1938 |
| 2,505,179 | Gaythwaite | Apr. 25, 1950 |
| 2,581,957 | Jones | Jan. 8, 1952 |